United States Patent
Bamford

(10) Patent No.: US 12,006,963 B2
(45) Date of Patent: Jun. 11, 2024

(54) SEAL SYSTEM FOR REMOVABLE COVER

(71) Applicant: Automatic Coating Limited, Toronto (CA)

(72) Inventor: Brad Bamford, Scarborough (CA)

(73) Assignee: Automatic Coating Limited, Toronto (CA)

( * ) Notice: Subject to any disclaimer, the term of this patent is extended or adjusted under 35 U.S.C. 154(b) by 407 days.

(21) Appl. No.: 17/168,957

(22) Filed: Feb. 5, 2021

(65) Prior Publication Data

US 2021/0239154 A1    Aug. 5, 2021

Related U.S. Application Data

(60) Provisional application No. 62/970,406, filed on Feb. 5, 2020.

(51) Int. Cl.
| | | |
|---|---|---|
| *F16B 43/00* | (2006.01) | |
| *F16B 33/00* | (2006.01) | |
| *F16B 37/14* | (2006.01) | |

(52) U.S. Cl.
CPC .......... *F16B 43/001* (2013.01); *F16B 33/004* (2013.01); *F16B 37/14* (2013.01)

(58) Field of Classification Search
CPC ...... F16B 43/001; F16B 33/004; F16B 37/14; F16B 2200/506; F16J 15/02; F16J 15/022
USPC ......... 411/375.5, 372.6, 373, 377, 82.1, 369, 411/542, 429
See application file for complete search history.

(56) References Cited

U.S. PATENT DOCUMENTS

| | | | | |
|---|---|---|---|---|
| 1,254,514 | A | * | 1/1918 | Lehmann ................ F16B 37/14 138/89.4 |
| 2,560,092 | A | * | 7/1951 | De La Mater ......... B65D 90/08 16/2.2 |
| 2,653,834 | A | * | 9/1953 | Purkhiser .............. F16L 25/026 403/220 |
| 2,723,048 | A | * | 11/1955 | Welch ................... F16B 43/001 220/681 |
| 2,915,152 | A | * | 12/1959 | Graham ................. B65D 90/08 220/681 |

(Continued)

FOREIGN PATENT DOCUMENTS

| | | | | | |
|---|---|---|---|---|---|
| GB | 2184187 | A | * | 6/1987 | ........... F16B 43/001 |
| JP | 2000249132 | A | * | 9/2000 | |
| KR | 1029119 | B1 | * | 4/2011 | ......... F16B 23/0069 |

*Primary Examiner* — Kristina R Fulton
*Assistant Examiner* — Jock Wong
(74) *Attorney, Agent, or Firm* — Laurie Wright; Christopher N. Hunter; Blake, Cassels & Graydon LLP

(57) ABSTRACT

A watertight seal is provided between a pair of components by providing a clearance between studs on one of the components and holes on the other. A non-conductive bushing is located in the void between the stud and hole and has a flange at one end. A first pair of resilient gaskets is located on opposite sides of the flange. A rigid washer overlies one of the resilient gaskets and a further resilient gasket is located on the opposite side of the washer. A nut having a blind bore extending from an end face is threaded to receive the stud and an O ring is located on the fastener between an end face of the nut and the second resilient gasket to effect a seal therebetween. Upon tightening of the nut on the fastener, the gaskets are compressed to provide a seal between adjacent surfaces and the bushing maintains the fasteners spaced from the holes.

8 Claims, 6 Drawing Sheets

(56) References Cited

U.S. PATENT DOCUMENTS

| | | | | |
|---|---|---|---|---|
| 4,479,163 | A * | 10/1984 | Bannink, Jr. | B64D 45/02 |
| | | | | 244/1 A |
| 5,481,790 | A * | 1/1996 | Koreis | F16L 41/086 |
| | | | | 285/200 |
| 2001/0022926 | A1 * | 9/2001 | Kitayama | F16B 43/001 |
| | | | | 411/531 |
| 2006/0000169 | A1 * | 1/2006 | Stephens | F16B 5/02 |
| | | | | 52/293.3 |
| 2012/0155988 | A1 * | 6/2012 | Schumacher | F16B 31/02 |
| | | | | 411/369 |
| 2014/0169911 | A1 * | 6/2014 | Sugimoto | C23C 4/18 |
| | | | | 106/270 |
| 2016/0068275 | A1 * | 3/2016 | Rizza | F16B 39/28 |
| | | | | 411/132 |
| 2017/0227041 | A1 * | 8/2017 | Gage | F16B 33/004 |
| 2019/0003504 | A1 * | 1/2019 | Bradley | B64C 3/26 |

* cited by examiner

SEAL SYSTEM FOR REMOVABLE COVER

CROSS-REFERENCE TO RELATED APPLICATIONS

This application claims priority from U.S. Provisional Application No. 62/970,406 filed on Feb. 5, 2020 incorporated herein by reference.

FIELD OF THE INVENTION

The present invention relates to a seal system to seal a removable cover and components used therein.

DESCRIPTION OF THE PRIOR ART

Structures are frequently formed from multiple components that are releasably secured to one another for ease of disassembly.

Fasteners, such as nut and bolt or screws, are commonly used to secure components to one another so they may be disassembled for maintenance. The fasteners are often a source of corrosion that may damage the components, particularly where they are used in extreme environments. The corrosion may result from dissimilar materials that induce galvanic action and/or the retention of corrosive liquids within the fastener.

One such environment is sea going vessels where the long-term exposure to sea water can cause extensive damage. This results in a significant increase in maintenance costs as well as prolonged periods out of service while repairs are made.

It is an object of the present invention to obviate or mitigate the above disadvantages.

SUMMARY OF THE INVENTION

According to the present invention there is provided a structure having a pair of components, releasably secured to one another by fasteners. The fasteners include a plurality of studs secured to one of the components and passing through holes in another of the components with a spacing between the radially inner surface of said hole and a radially outer surface of said stud to define an annular void between each hole and a respective one of said studs. The fastener also includes a nut having a blind bore extending from an end face and threaded to receive said stud. A seal assembly provides a seal between said components. The seal assembly comprises a first resilient seal extending between and located on the studs to be interposed between the components and a non conductive bushing on each of the studs and located in respective ones of the annular voids. Each of the bushings has a radial flange to overlie the periphery of said hole with a pair of resilient gaskets located on opposite sides of each of said radial flanges. A rigid washer is located on a respective one of the studs and overlying one of said first resilient gaskets. A second resilient gasket is located on the opposite side of the washer to the first resilient gasket to sandwich the washer between one of the first resilient gaskets and the second resilient gasket. An 0 ring located on the stud between an end face of the nut and the second resilient gasket to effect a seal therebetween. Upon tightening of the nut on the stud, the gaskets are compressed to provide a seal between adjacent surfaces and the bushing maintains the stud spaced from the holes.

BRIEF DESCRIPTION OF THE DRAWINGS

The features of the invention will become more apparent in the following detailed description in which reference is made to the appended drawings wherein.

DETAILED DESCRIPTION OF THE INVENTION

Figure 1:
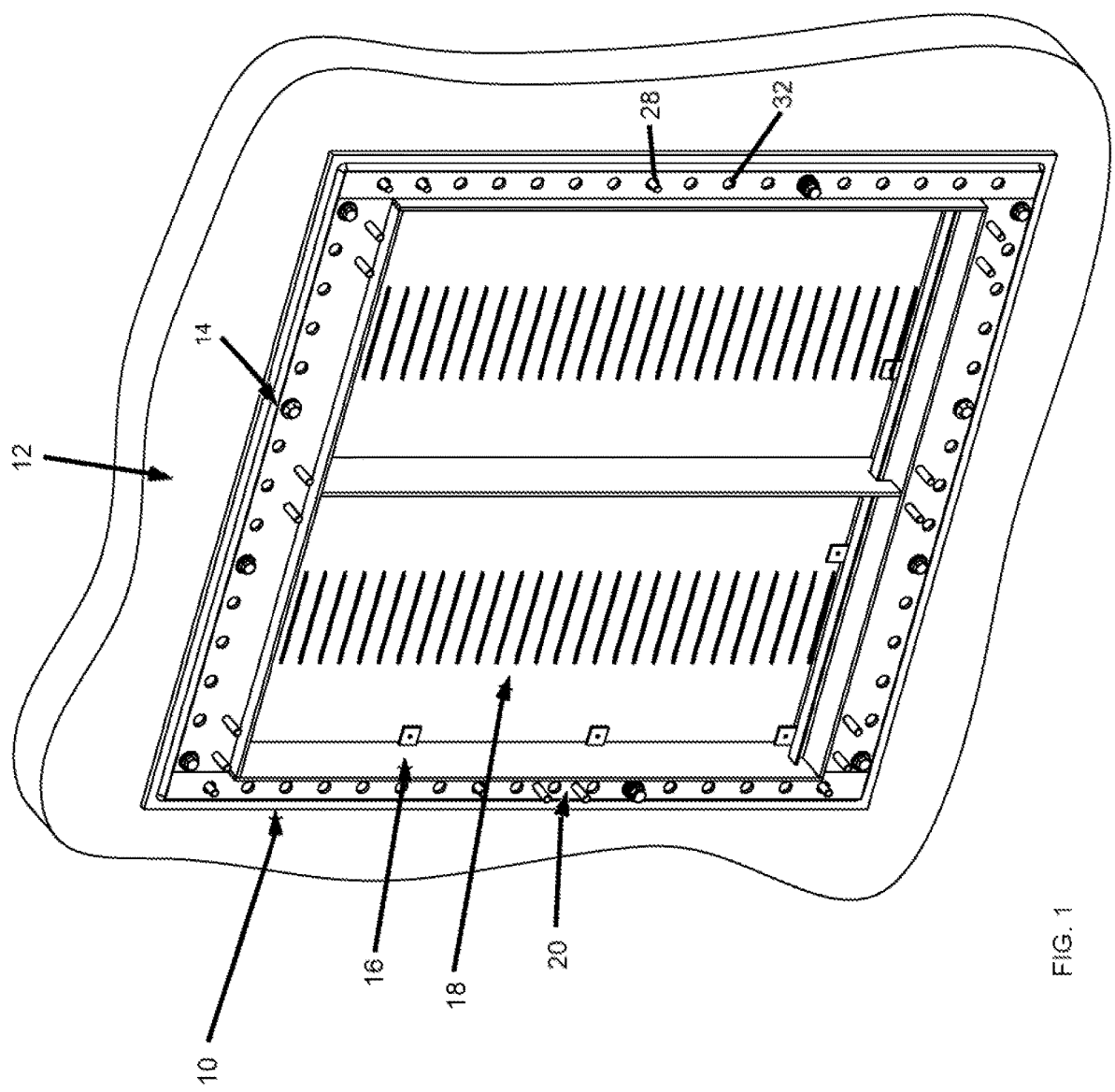
FIG. 1 is a perspective view of a louvre installed on a ship.

Referring firstly to FIG. 1, a pair of components exemplified by a louvre assembly 10 and the superstructure 12 of a ship are releasably connected by fastener assemblies 14. The louvre assembly 10 has a casing 16 to enclose louvre slats 18 and a flange 20 that extends outwardly from the casing 16.

The superstructure 12 has an aperture 22 sized to receive the casing 16 with the flange 20 overlying the peripheral edge 24 of the aperture 22.

Figure 2:
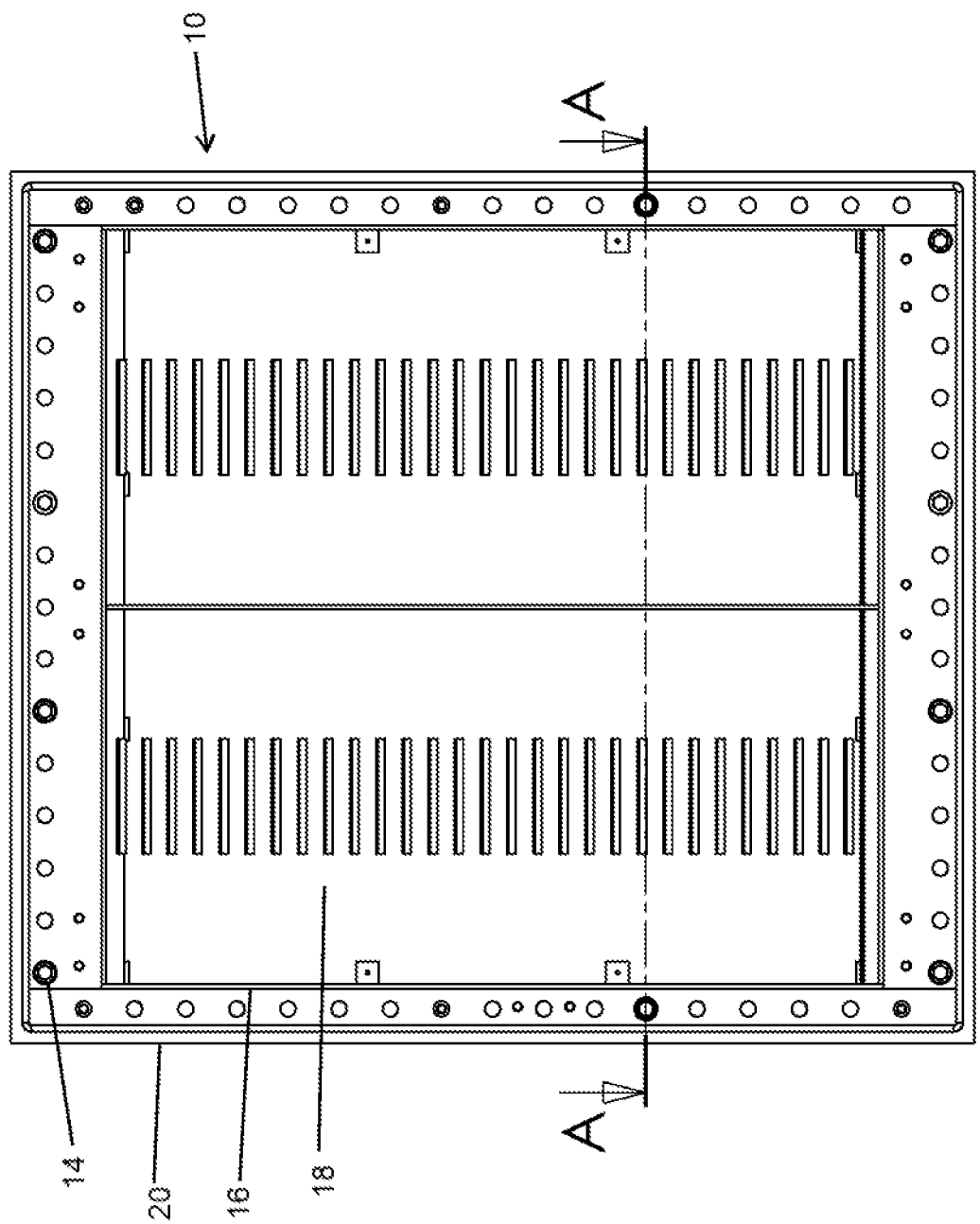
FIG. 2 is a front elevation of the louvre of FIG. 1.
Figure 3:
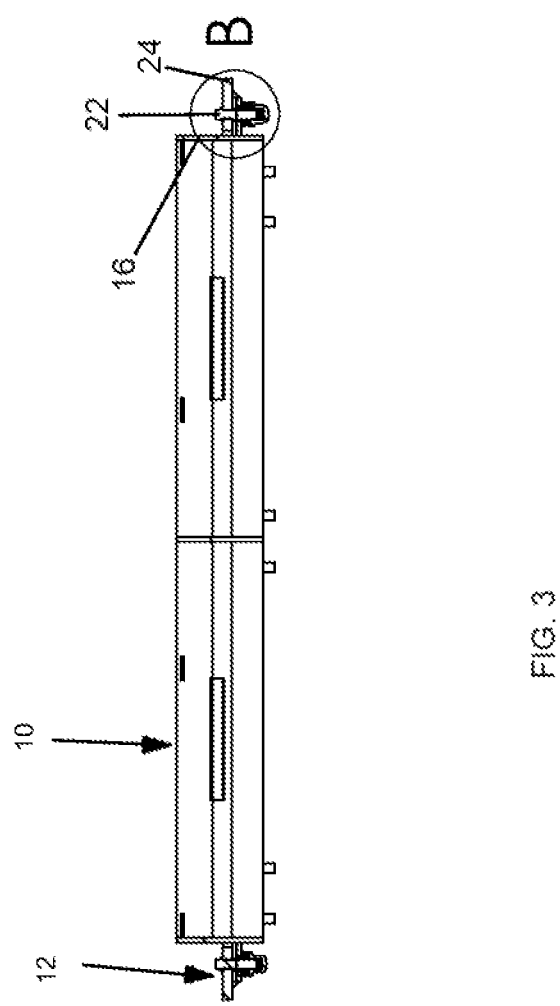
FIG. 3 is a view on the line A-A of FIG. 2.
Figure 4:
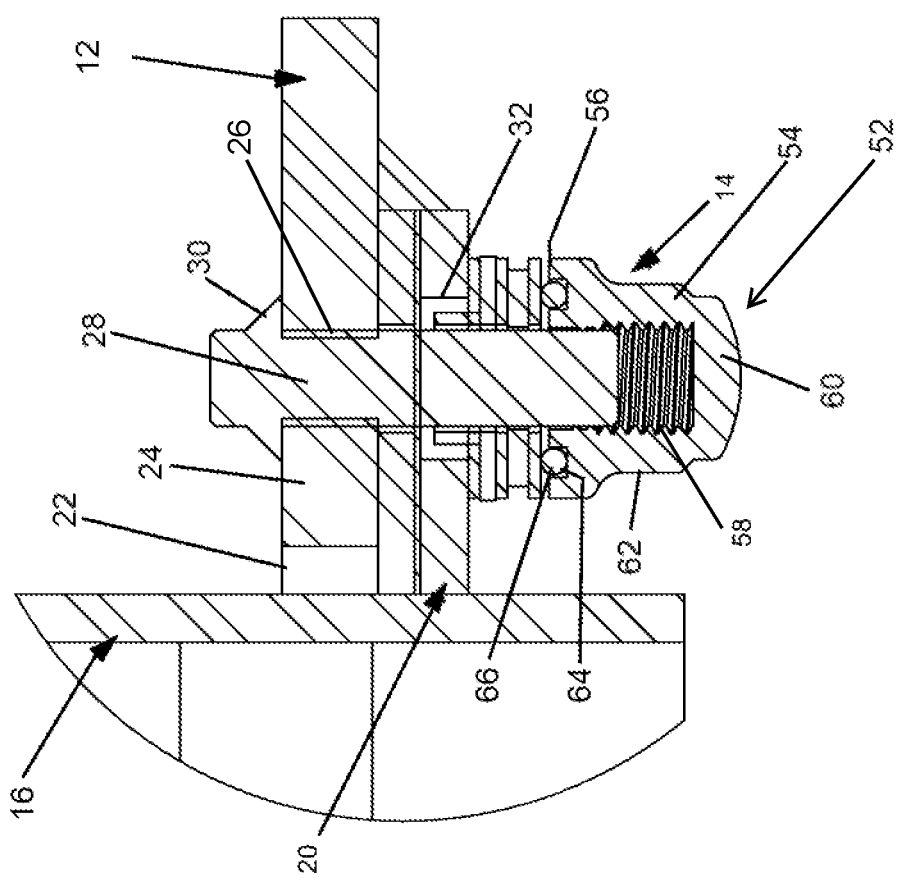
FIG. 4 is an enlarged sectional view within the circle B of FIG. 3 of a fastener used to secure the louvre of FIG. 2.
Figure 5:
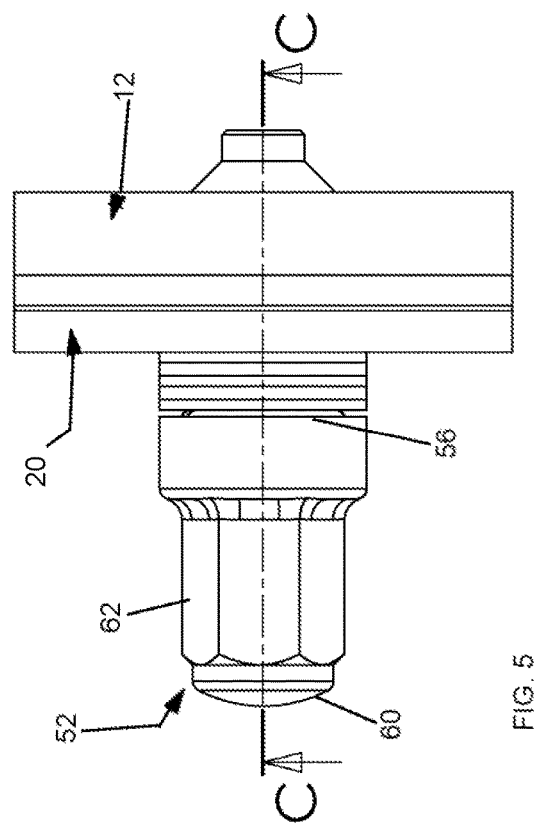
FIG. 5 is a side elevation of the fastener of FIG. 4.
Figure 7:
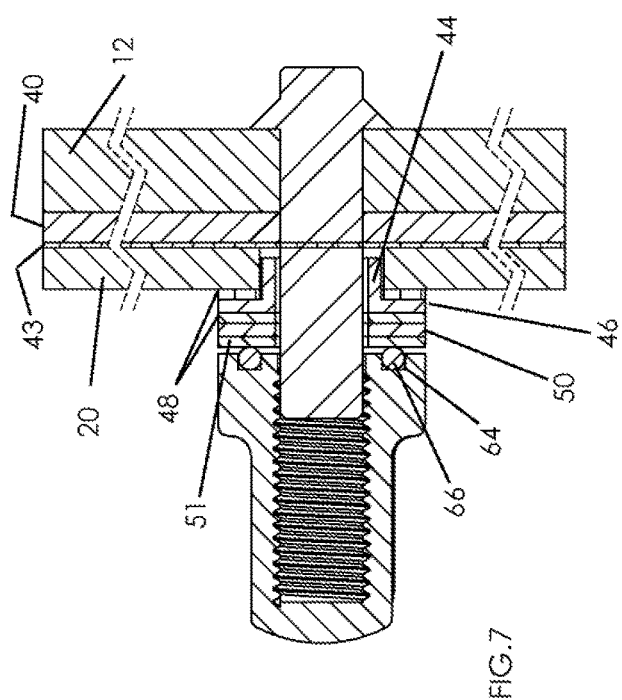
FIG. 7 is an enlarged view of FIG. 4 taken on the section C-C of FIG. 5.

As best seen in FIGS. 2 to 4, the fastener assemblies include threaded holes 26 formed in a regular pattern in the peripheral edge 24 and studs 28 that are threaded in to the holes to project outwardly from the superstructure 12. The studs 28 are secured by welding, indicated at 30.

The flange 20 has a corresponding pattern of holes 32 to receive respective ones of the studs 28 and locate the louvre 10 on the superstructure 12. The louvre 10 and superstructure 12 are treated with a corrosion resistant coating preferably a dual immersion polymer powder coating process such as that available under the trade name Tidal Coating available from Automatic Coating Limited of Toronto, Canada. This coating process has proven effective in inhibiting corrosion in the treated components but it has been found that corrosion may still be propagated from the region of the fastener assembly 14. As explained more fully below, the fastener assembly 14 incorporates a number of measures to mitigate such corrosion.

Figure 6:
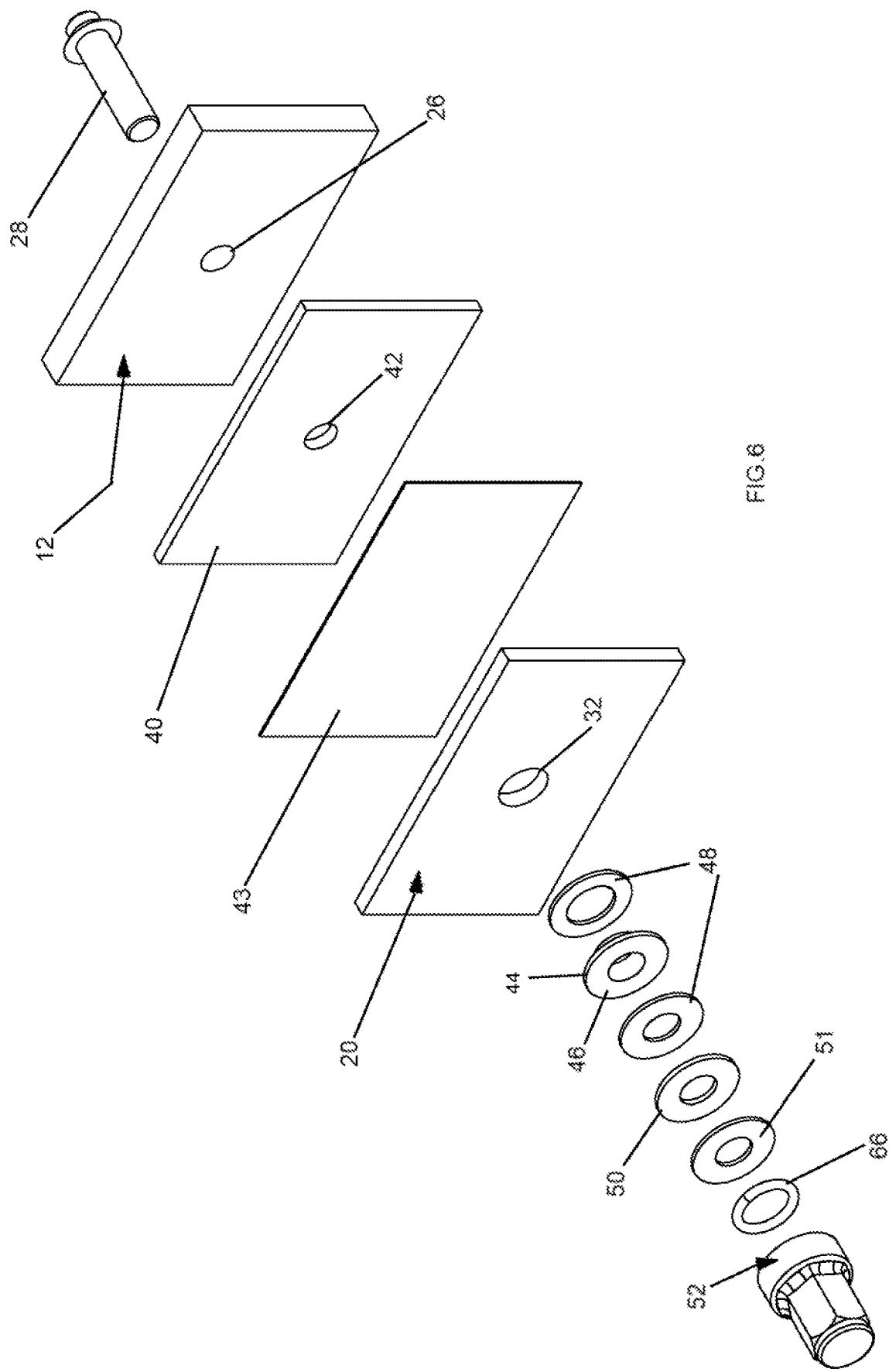
FIG. 6 is an exploded view showing the components of the fastener of FIG. 4.

Referring in particular to FIGS. 4 and 6, a resilient seal 40 is located between the flange 20 and the superstructure 12. The seal 40 extends about the flange 20 has holes 42 that fit closely over the studs 28. The seal 40 is preferably a rubber, neoprene of polymer material with sufficient resilience to conform to the adjacent surfaces and effect a seal between them upon compression. A thin layer of sealant 43, such as that sold under the trade name Master Weld™ 626 (previously Degaseal 26) by BASF is spread over the outwardly directed face of the seal 40.

The holes 32 in the flange 20 are a clearance fit on the studs 28 so that the interior surface of the holes 32 is radially spaced from the exterior surface of the studs 28. The spacing between the stud 28 and hole 32 is maintained by a top hat plastic bushing 44 with a radial flange 46. The bushing 44 is formed from a suitable non-conductive plastics material to isolate electrically the stud 28 and the inner surface of the hole 32. Annular resilient gaskets 48 preferably rubber, neoprene or polymer, are located on opposite sides of the radial flange 46 of the bushing 44 so as to be interposed between the flange 46 and the flange 20 on one side and between the flange 46 and a stainless steel washer 50 on the opposite side. A further resilient gasket 51 is interposed between the washer 50 and a nut 52 that is threaded on the stud 28 to retain the louver.

The nut 52 has a body 54 with an end face 56. A threaded blind bore 58 extends inwardly from the end face and is dimensioned to receive the stud 28. The opposite end 60 of the body 54 to the end face 56 closes the bore 58 to provide a cap and flats 62 are provided on the body 54 for application of a hexagonal wrench.

The end face 56 of the nut 52 is formed with an annular recess 64 to accommodate an O-ring 66 that bears against the rubber gasket 51. The nut 52 is coated in the same manner as the louvre 10 including the recess 64 which provides a continuous corrosion resistant coating over the body 54.

In use, the louvre 10 is mounted on the studs 28 and the rubber gaskets 40, 48, 51, washer 50 and bushing 44 assembled. The nut 52 is then threaded on to the studs 28 and tightened in sequence around the flange 20. As the nut is tightened the gaskets 48, 51 are compressed to seal between the facing surfaces of the nut, washer and flange.

It will be noted that the provision of the bushing 44 separates the louvre 10 from the stud 28 that is secured to the superstructure 12. The gasket 40 also separates the flange 20 of the louvre 10 from the periphery 24 of the opening 22 so that galvanic action between them is inhibited.

Moreover, the provision of the gaskets 48 to either side of the flange 46 of the bushing 44 effectively seal between the flange 20 and the stud 28 to inhibit ingress of sea water in to the hole 32 where corrosion could occur.

The sealing effect is enhanced by the washer 50 which maintains a uniform pressure on the gaskets 48 as the nut 52 is tightened and the O-ring 66 and gasket 51 co-operate to seal between the end face 56 and the washer 50. The gaskets 48 and 51 isolate the nut 52 from the flange 20 to inhibit galvanic action that might occur with direct contact.

Although the invention has been described with reference to certain specific embodiments, various modifications thereof will be apparent to those skilled in the art without departing from the spirit and scope of the invention. The entire disclosures of all references recited above are incorporated herein by reference.

What is claimed is:

1. A structure having a pair of components, releasably secured to one another by fasteners, said fasteners including a plurality of studs secured to one of said components and passing through holes in another of said components with a spacing between a radially inner surface of said hole and a radially outer surface of said stud to define an annular void between each hole and a respective one of said studs, and a nut having a blind bore extending from an end face and threaded to receive said stud, said structure further including a seal assembly to provide a seal between said components, said seal assembly comprising a first resilient seal extending between and located on said studs to be interposed between said components, a non-conductive bushing on each of said studs and located in respective ones of said annular voids, each of said bushings having a radial flange to overlie a periphery of said hole, a pair of resilient gaskets located on opposite sides of each of said radial flanges, a rigid washer located on a respective one of said studs and overlying one of said pair of resilient gaskets, a further resilient gasket located on an opposite side of said rigid washer to said one of said pair of resilient gaskets to sandwich said rigid washer between one of said pair of resilient gaskets and said further resilient gasket, and an O-ring located on said stud between an end face of said nut and said further resilient gasket to effect a seal therebetween, whereby, upon tightening of said nut on said stud, said gaskets are compressed to provide a seal between adjacent surfaces and said bushing maintains said stud spaced from said holes.

2. The structure according to claim 1 wherein said O-ring is located in an annular recess formed in said end face of said nut.

3. The structure according to claim 2 wherein said annular recess is coated with a corrosion resistant coating.

4. The structure according to claim 3 wherein an exterior surface of said nut is coated with a corrosion resistant coating.

5. The structure according to claim 1 wherein a sealant is applied to a face of said first resilient seal.

6. The structure according to claim 1 wherein said rigid washer is formed from a corrosion resistant material.

7. The structure according to claim 1 wherein said rigid washer is stainless steel.

8. The structure according to claim 1 wherein an opening is formed in said one component and said studs extend about said opening.

* * * * *